Patented Oct. 26, 1926.

1,604,312

UNITED STATES PATENT OFFICE.

HENRY L. PRESTHOLDT, OF MINNEAPOLIS, MINNESOTA.

CASEIN GLUE.

No Drawing.  Application filed April 17, 1922. Serial No. 554,201.

My present invention provides a new composition of matter herein designated as "casein glue," but which from its broader aspect is an adhesive composition adapted for use, by itself or commingled with other substances, as an adhesive coating.

In this improved adhesive composition, casein is used as an adhesive base and is commingled with dextrine, sodium aluminate, calcium tannate, sodium fluoride, calcium chloride, and sodium formate.

The above noted elements, form an excellent solvent of casein of the hydrochloric acid type, and will, when properly associated, result in very cheap but very effective adhesive for many uses, and especially for use in veneering wood.

I have obtained a very cheap and highly efficient glue of the above noted character by the use of the above noted substances in accordance with the following formula:

| | Parts. |
|---|---|
| Casein | 50 to 75 |
| Dextrine | 5 to 20 |
| Sodium aluminate | 3 to 15 |
| Calcium tannate | 2 to 8 |
| Sodium fluoride | 3 to 10 |
| Calcium chloride | 2 to 6 |
| Sodium formate | ½ to 3 |

The above noted substances are commingled in dry or powdered form and are sold in that condition. When the adhesive is to be used, the composition is introduced into water to form an emulsion, and it is then, of course, that the chemical reactions that develop the adhesive qualities of the composition, will take place. After these reactions have taken place, the emulsion is adapted to be used as a glue or as a coating, or to be commingled with other substances such as paint or calcimine, which contain color pigments. When desired, however, the color-producing pigments may be commingled with the dry composition. When the composition is used simply as a glue, no additions to the formula above given, except water, will be required.

Casein and dextrine both have adhesive qualities in the form of colloids. The colloidal properties are brought out in a solution of sodium aluminate, sodium fluoride, and calcium chloride, in contact with hot water. Sodium formate is added for the purpose of preventing decomposition, the formate having great antiseptic qualities. Calcium tannate is added in this instance to give increased body to the glue mixture, taking the place of the filler.

What I claim is:

An adhesive composition made in accordance with the following formula:

| | Parts. |
|---|---|
| Casein | 50 to 75 |
| Dextrine | 5 to 20 |
| Sodium aluminate | 3 to 15 |
| Calcium tannate | 2 to 8 |
| Sodium fluoride | 3 to 10 |
| Calcium chloride | 2 to 6 |
| Sodium formate | ½ to 3 |

In testimony whereof I affix my signature.

HENRY L. PRESTHOLDT.